(12) United States Patent
Laib et al.

(10) Patent No.: US 9,056,570 B2
(45) Date of Patent: Jun. 16, 2015

(54) VARIABLE THERMAL RESISTANCE DEVICE FOR VEHICULAR SEATS

(71) Applicant: The Boeing Company, Chicago, IL (US)

(72) Inventors: Trevor M. Laib, Woodinville, WA (US); Anthony R. Parkington, Lynnwood, WA (US); Shawn A. Claflin, Seattle, WA (US); Henry V. R. Fletcher, III, Everett, WA (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 13/779,242

(22) Filed: Feb. 27, 2013

(65) Prior Publication Data

US 2014/0239677 A1    Aug. 28, 2014

(51) Int. Cl.
*B60N 2/56* (2006.01)
*B64D 11/06* (2006.01)

(52) U.S. Cl.
CPC ............ *B60N 2/5642* (2013.01); *B60N 2/5664* (2013.01); *B64D 11/0626* (2014.12); *Y02T 50/46* (2013.01); *B64D 11/0649* (2014.12)

(58) Field of Classification Search
CPC .. B60N 2/5642; B60N 2/5664; B60N 2/5657; B60N 2/5628; B60N 2/5635; B64D 11/0626; B64D 11/0649; Y02T 50/46; A47C 7/74; A47C 7/748
USPC ............................. 297/180.13, 180.1, 180.14
See application file for complete search history.

(56) References Cited

U.S. PATENT DOCUMENTS

| 2,022,959 | A | * | 12/1935 | Gordon | .......................... 454/120 |
| 2,978,972 | A | * | 4/1961 | Hake | .............................. 454/120 |
| 2,992,604 | A | * | 7/1961 | Trotman et al. | ............... 454/120 |
| 7,871,039 | B2 | * | 1/2011 | Fullerton et al. | ............ 244/118.5 |
| 2003/0085607 | A1 | | 5/2003 | Jones et al. | |
| 2007/0176471 | A1 | * | 8/2007 | Knoll | ........................ 297/180.14 |

* cited by examiner

*Primary Examiner* — Milton Nelson, Jr.
(74) *Attorney, Agent, or Firm* — Ostrager Chong Flaherty & Broitman P.C.

(57) ABSTRACT

A seating assembly comprising: a frame having an opening; a support surface spanning the opening in the frame; a variable thermal resistance device that opposes the support surface when the variable thermal resistance device is in a closed state in which airflow is obstructed, the variable thermal resistance device being movable from the closed state to an open state in which airflow is not obstructed and from the open state to the closed state; and an actuator coupled to the variable thermal resistance device. The actuator is operable to actuate movement of the variable thermal resistance device between the open and closed states.

21 Claims, 13 Drawing Sheets

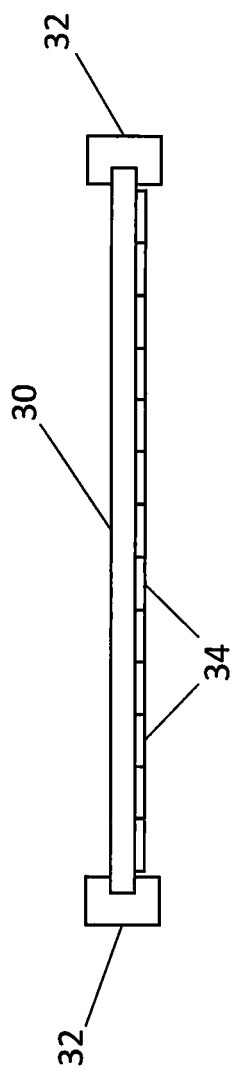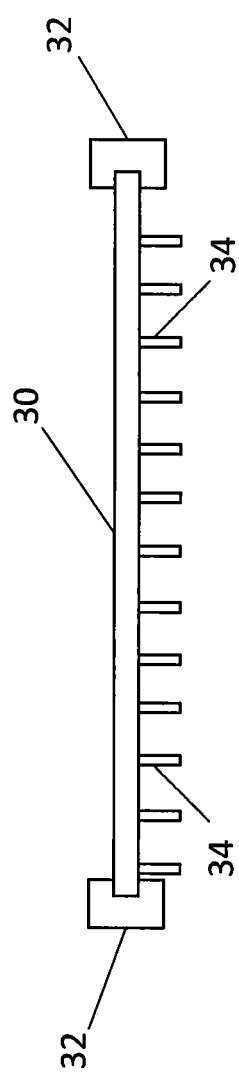

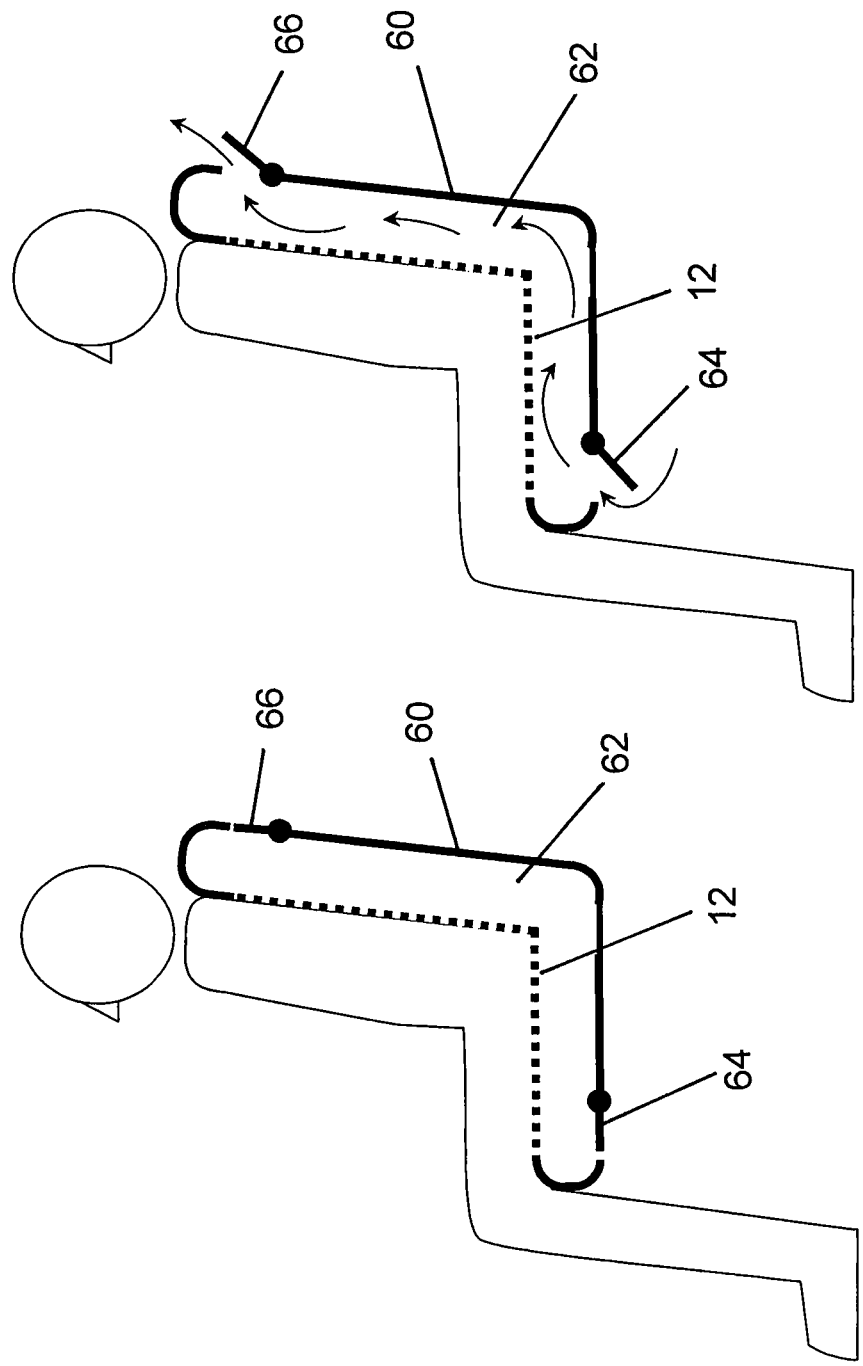

VARIABLE THERMAL RESISTANCE DEVICE FOR VEHICULAR SEATS

BACKGROUND

This disclosure generally relates to passenger seats for vehicles. In particular, this disclosure relates to passenger seats for aircraft.

During hot day ground conditions at the gate, an airplane's air conditioning system is typically not powered, resulting in high temperatures in the passenger cabin. When the passengers or crew sit, the seat increases their clothing resistance, making them even warmer. This results in hot, sweaty, uncomfortable seated passengers and crew while the airplane is on the ground.

The current solution for hot conditions in a conventional aircraft passenger seat is to provide passenger and crew with personal air outlets (commonly called "gaspers"). Gaspers increase heat transfer and evaporation from (i.e., cool) the exposed surfaces of a seated person's body, but they cannot provide a cooling effect to surfaces blocked by seat cushions and fabric. It may also be the case that some passengers departing from an airport on a hot day find that the airflow from the gaspers is insufficient to eliminate discomfort while the aircraft remains at the gate.

A new generation of lightweight passenger seats use a mesh fabric material or webbing instead of solid cushions. If the pores in the mesh material are left open, this ventilates the seated person's back and thighs, resulting in a cooler sensation during hot-day ground conditions. But a seat made in this manner would over-ventilate the seated person at cruise altitude, resulting in cold, chilly, uncomfortable seated passengers and crew. The current solution for cold conditions in a mesh seat is to cover the seat face with leather, which unfortunately also eliminates the advantage the mesh seat has for hot day conditions.

It would be desirable to modify existing passenger seats so that the temperature-reducing effect of gaspers could be supplemented when a vehicle is on the ground during hot-day conditions.

SUMMARY

One aspect of the subject matter disclosed in detail hereinafter is a seating assembly comprising: a frame having an opening; a support surface spanning the opening in the frame; a variable thermal resistance device that opposes the support surface when the variable thermal resistance device is in a closed state in which airflow is obstructed, the variable thermal resistance device being movable from the closed state to an open state in which airflow is not obstructed and from the open state to the closed state; and an actuator coupled to the variable thermal resistance device. The actuator is operable to actuate movement of the variable thermal resistance device between the open and closed states. The support surface can be air-permeable or non-porous. Optionally, one or both of the support surface and the variable thermal resistance device comprises material having high thermal conductivity.

Another aspect of the disclosed subject matter is a seating assembly comprising: a frame having an opening; a support surface spanning the opening in the frame; a variable thermal resistance device that opposes the support surface when the variable thermal resistance device is in a closed state in which airflow is obstructed, the variable thermal resistance device being movable from the closed state to an open state in which airflow is not obstructed and from the open state to the closed state; and an actuator coupled to the variable thermal resistance device, the actuator being operable to actuate movement of the variable thermal resistance device between the open and closed states. One or both of the support surface and the variable thermal resistance device comprises material having high thermal conductivity of at least 40 W/m-° K.

In accordance with one embodiment disclosed in detail below, a seating assembly comprises: a frame having an opening; a suspension fabric under tension and spanning the opening in the frame; a multiplicity of louvers that are movable between a closed state in which the louvers obstruct airflow toward the suspension fabric and an open state in which the louvers do not obstruct airflow toward the suspension fabric; and a rotatable cylinder coupled to the louvers by at least one cord. The louvers move from the closed state to the open state when the rotatable cylinder is rotated in one direction, and move from the open state to the closed state when the rotatable cylinder is rotated in another direction opposite to the one direction. The louvers may comprise magnets or hook-and-loop fasteners arranged to hold the louvers in the closed state. Each louver may comprise a foam core wrapped in fabric which is coupled to the suspension fabric.

Other aspects of the improved passenger seat designs are disclosed and claimed below.

BRIEF DESCRIPTION OF THE DRAWINGS

Various embodiments will be hereinafter described with reference to drawings, which show some but not all components of various passenger seat assemblies.

FIGS. 10A and 10B are diagrams showing top views of a portion of a louver-equipped passenger seat in which the support surface is a non-porous material having high thermal conductivity. The louvers are shown in their fully closed (see FIG. 10A) and fully open (see FIG. 10B) states.

FIGS. 16A and 16B are diagrams showing an alternative embodiment having vents which can be opened or closed to adjust the temperature inside a space behind and/or under the seated passenger.

Reference will hereinafter be made to the drawings in which similar elements in different drawings bear the same reference numerals.

DETAILED DESCRIPTION

The subject matter disclosed herein is directed to passenger seats that can be adjusted to provide thermal comfort to seated passengers in hot and cold conditions. These improved passenger seats provide greater thermal comfort to seated persons during hot-day ground conditions by decreasing the effective insulation value of the seated person's clothing. During cold conditions, this effect can be negated, increasing the effective insulation value of the seated person's clothing.

The variable thermal resistance passenger seats disclosed in detail hereinafter are intended to supplement (rather than replace) gaspers, by providing cooling to the surfaces which support the seated passenger's body, which can become hot and sweaty in hot-day conditions. The proposed seat provides this cooling function only as desired, such as during hot day conditions, and not during cold cruise conditions, when the typical passenger desires enhanced insulation.

The disclosed variable thermal resistance passenger seats provide enhanced comfort under circumstances when the normal cooling system is not powered, such as during loading and unloading of passengers, and prior to start of the auxiliary power unit. These variable thermal resistance passenger seats also provide enhanced comfort during delayed departures, especially for equipment failures, when the normal ventilation and gasper systems might not be powered. The improved seat designs disclosed herein improve hot day ground thermal performance with minimal or zero weight gain versus mesh fabric seats, or a substantial weight reduction versus conventional seats.

Various embodiments of passenger seats provided with systems that enable the passenger to vary the thermal resistance of his seat will now be described. More specifically, variable thermal resistance devices in accordance with various embodiments will be described in the context of passenger seats on an aircraft. However, the variable thermal resistance devices to be disclosed also have application in passenger seats on other transport vehicles, such as buses and trains, or on furniture, such as office furniture.

In accordance with various embodiments, a variable thermal resistance device can be incorporated in passenger seat assemblies having either air-permeable passenger support surfaces (e.g., suspension fabric), in which case the variable thermal resistance device either obstructs or does not obstruct airflow through the air-permeable material, or air-impermeable passenger support surfaces (e.g., closed-cell foam or a continuous sheet of strong, stretchable plastic material), in which case the variable thermal resistance device either obstructs or does not obstruct airflow across the back surface of the air-impermeable material. In either case, the passenger support surfaces may be incorporated in passenger seat assemblies of the type shown in FIGS. 1-4.

Figure 1:
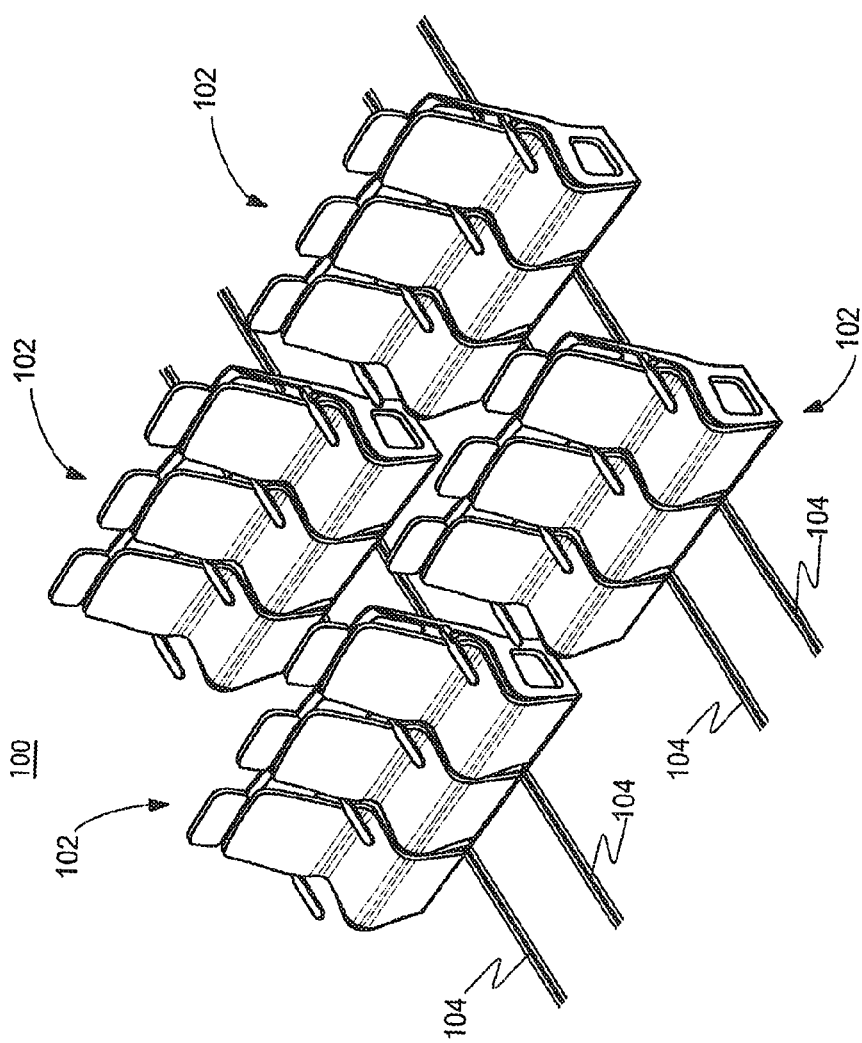
FIG. 1 is a diagram showing a front isometric view of an aircraft seating layout for a known embodiment of a passenger seat assembly.
Figure 2:
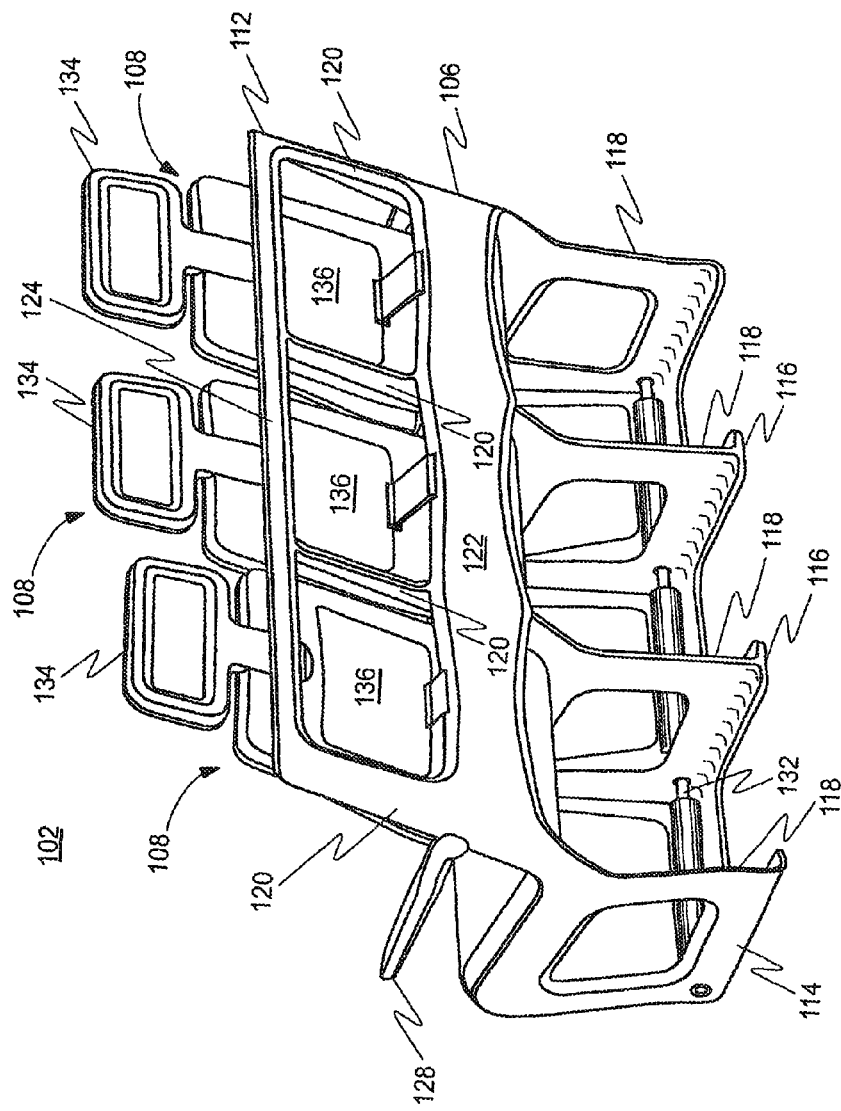
FIG. 2 is a diagram showing a rear isometric view of the embodiment of a passenger seat assembly shown in FIG. 1.

FIG. 1 is a front isometric view of a portion of an aircraft seating layout 100 using an embodiment of a passenger seat assembly 102 (shown in detail in the rear isometric view of FIG. 2). Seat assemblies 102 are suitable for use as passenger seats in an aircraft, e.g., as a row in a commercial aircraft. Seat assemblies 102 can be coupled to an appropriate and suitable airframe structure of the aircraft, such as the floor, one or more sidewalls, support beams, or the like. In the embodiment depicted in FIG. 1, seat assemblies 102 are coupled to seat tracks 104, which provide a mounting interface between seat assemblies 102 and the airframe structure of the aircraft.

Although each seat assembly 102 is depicted as a triple seat assembly, the concepts, techniques, features, and technologies described herein can be extended to any practical seat configuration, such as a double seat, a quad seat, a single seat, or a seat configured to accommodate any number of passengers, limited only by practical size restrictions, structural material properties, and aircraft interior configuration regulations.

Referring to FIG. 2, seat assembly 102 includes two primary modular components: a structural frame 106 and a plurality of comfort frame assemblies 108, which are coupled to and supported by structural frame 106 when seat assembly 102 is deployed. This modular approach assigns the two main functions of a passenger seat (comfortably support the passenger and restrain the passenger) to comfort frame assemblies 108 and structural frame 106, respectively. In this embodiment, seat assembly 102 has three comfort frame assemblies 108—one for each passenger seat location. Comfort frame assemblies 108 may be virtually identical in a commercial aircraft deployment.

A modular passenger seat assembly as described herein may also include headrests 134 and/or tray tables 136 (see FIG. 2). Tray tables 136 may be designed for storage in the back of the support frames of the comfort frame assemblies 108. The back of the structural frame 106 may include appropriately sized openings formed therein to accommodate the lowering of tray tables 136.

Figure 3:
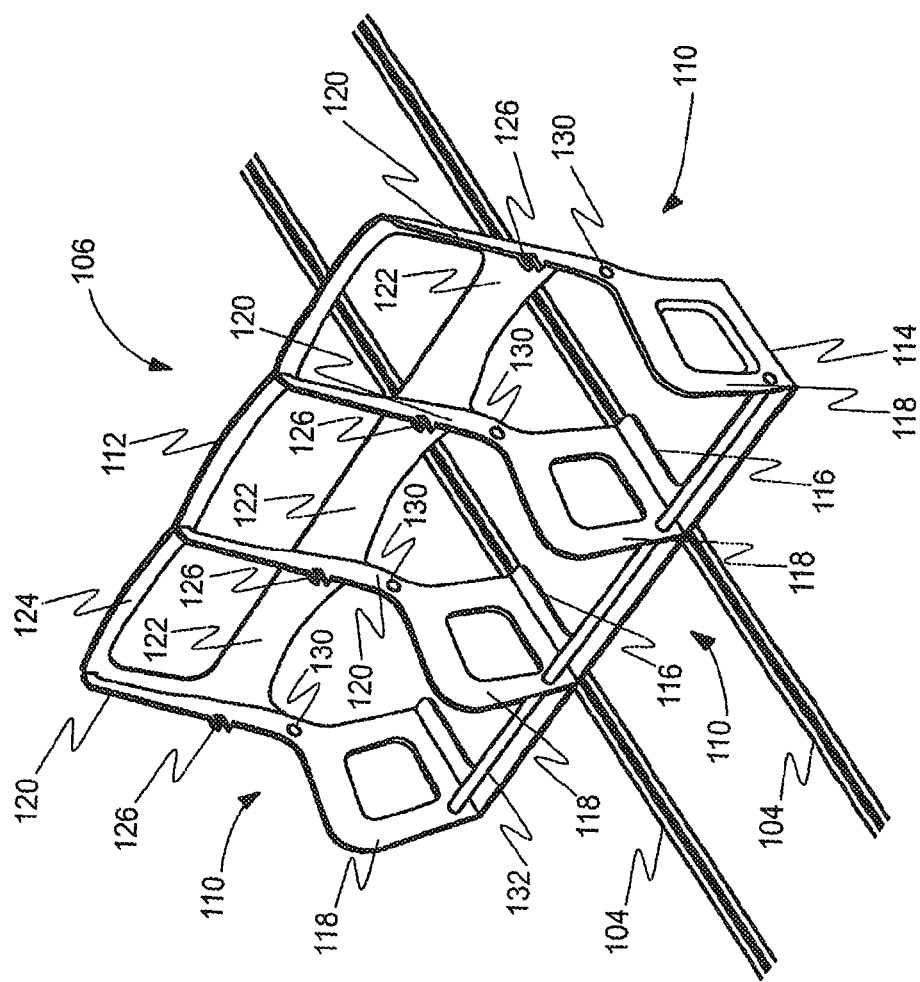
FIG. 3 is a diagram showing a front isometric view of a one-piece structural frame incorporated in the passenger seat assembly shown in FIG. 1.

FIG. 3 is a front isometric view of a structural frame 106 installed on seat tracks 104. Structural frame 106 is suitably configured to support at least one passenger (three passengers in the illustrated embodiment), and to transfer dynamic loads associated with the passenger(s) to an airframe structure of the aircraft. For example, structural frame 106 can be designed to facilitate the transfer of loads from seat assembly 102 to seat tracks 104, the floor of the aircraft, the sidewalls of the aircraft, or other structural components of the aircraft. Structural frame 106 is fabricated as a one-piece component. Structural frame 106 may be designed and fabricated to be a monocoque construction, i.e., such that it absorbs and/or transfers most of the loads and stresses to which seat assembly 102 is subjected. In certain embodiments, structural frame 106 is a one-piece composite construction, for example, a molded composite component.

Still referring to FIG. 3, structural frame 106 generally includes N seat subframes 110 corresponding to N passenger seat locations (in the illustrated embodiment, N=3). Considering the one-piece construction of structural frame 106, seat subframes 110 represent integral features of structural frame 106. Structural frame 106 has an upper end 112, a lower end 114, and an aircraft mounting structure 116 formed therein. Aircraft mounting structure 116, which is located at lower end 114, is suitably configured to accommodate coupling to the airframe structure of the aircraft. Aircraft mounting structure 116 may, for example, be designed for compatibility with seat tracks 104 that are integrated into the floor of the aircraft. For this embodiment, aircraft mounting structure 116 is realized as a number of mounting "feet" or "rails" that cooperate with seat tracks 104 and/or accommodate fasteners or coupling mechanisms that are utilized to attach structural frame 106 to seat tracks 104.

Lower end 114 generally represents the base of structural frame 106, and upper end 112 generally represents the seat-back portion of structural frame 106. Structural frame 106 may also include the following integrated features formed therein: a number of support legs 118; a number of back support elements 120; a lower back crossbeam 122; and an upper back crossbeam 124. As depicted in the figures, aircraft mounting structure 116 is connected to support legs 118, which are connected to back support elements 120. Back support elements 120 extend upwardly and in a slightly angled orientation from support legs 118. In this embodiment, two of the support legs 118 and two of the back support elements 120 are common to two of the seat subframes 110. On the other hand, the outermost support legs 118 and the outermost back support elements 120 are utilized for only one seat subframe 110. Lower back crossbeam 122 and upper back crossbeam 124 are connected to the back support elements 120. Structural frame 106 may also include armrest coupling features 126 (see FIG. 3) for the attachment of armrests 128 (see FIG. 2) to seat assembly 102, and seat belt coupling features 130 (see FIG. 3) for the attachment of passenger seat belts to seat assembly 102.

Referring again to FIG. 2, seat assembly 102 comprises multiple comfort frame assemblies 108, which respectively correspond to the seat subframes 110. Each comfort frame assembly 108 is suitably configured to cooperate with structural frame 106 to accommodate movement of comfort frame assembly 108 relative to structural frame 106. In accordance with some embodiments, comfort frame assembly 108 can pivot (recline) independently relative to structural frame 106. Moreover, structural frame 106 itself is designed to be a "fixed" support component for comfort frame assemblies 108. Thus, comfort frame assemblies 108 move within the fixed confines of structural frame 106.

Each comfort frame assembly 108 is fabricated from two main components: a support frame (item 200 shown in FIG. 4) and a fabric carrier (item 218 shown in FIG. 5) coupled to the support frame 106, where the fabric carrier 218 defines a seating surface of the respective comfort frame assembly 108.

Figure 4:
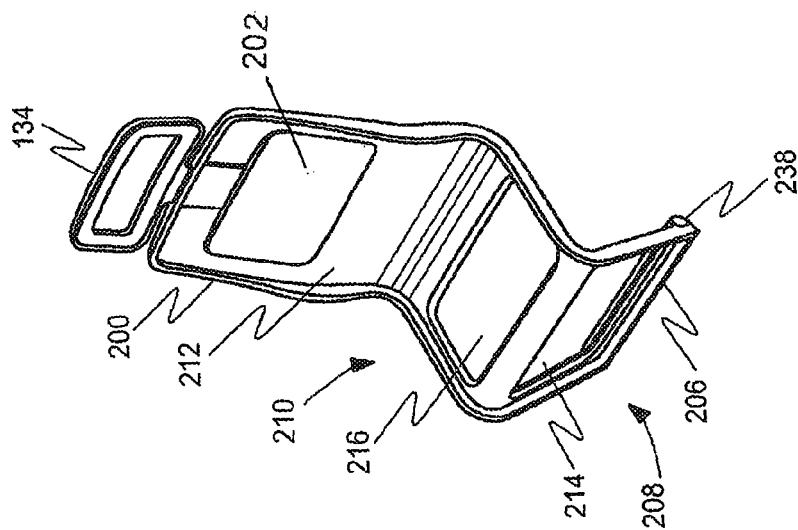
FIG. 4 is a diagram showing a front isometric view of a one-piece support frame incorporated in the passenger seat assembly shown in FIG. 1.

As seen in FIG. 4, support frame 200 can be fabricated as a one-piece component. In certain embodiments, support frame 200 is a lightweight molded composite component. An embodiment of support frame 200 may be fabricated using any number of materials and compositions, including, without limitation, the materials and compositions described above in the context of structural frame 106. In addition, support frame 200 is ergonomically shaped and contoured according to the desired seat configuration. The particular embodiment depicted in FIG. 4 comprises a lower edge 206, a lower leg frame section 208 connected to lower edge 206, a seating frame section 210 connected to lower leg frame section 208, and a back section 212 connected to seating frame section 210. These features are formed as integral features of one-piece support frame 200. Back section 212 is preferably a solid panel section having an opening 202. Lower leg frame section 208 comprises an outer frame that defines an opening 214, and seating frame section 210 comprises an outer frame that defines an opening 216. Openings 202/214/216 are covered with material in the finished assembly. These openings 202/214/216 provide ventilation for increased passenger comfort. Each comfort frame assembly 108 can be suitably configured to reduce pressure points and to provide passive temperature control due to air circulation around the passenger.

Figure 5:
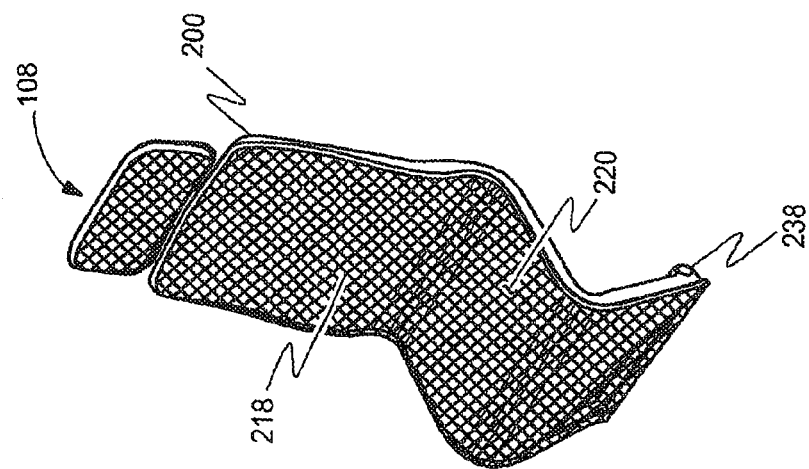
FIG. 5 is a diagram showing a front isometric view of a comfort frame assembly which incorporates the support frame shown in FIG. 4.

FIG. 5 is an isometric view of a comfort frame assembly 108 in accordance with an alternative embodiment. This comfort frame assembly 108 comprises a fabric carrier 218 coupled to a support frame 200. The fabric carrier 218 comprises a strong, stretchable suspension fabric 220. The perimeter of the suspension fabric 220 is attached to a fabric carrier ring (not visible in FIG. 5), which is attached to support frame 200. The suspension fabric 220 primarily serves to support the weight of the occupant.

Figure 6:
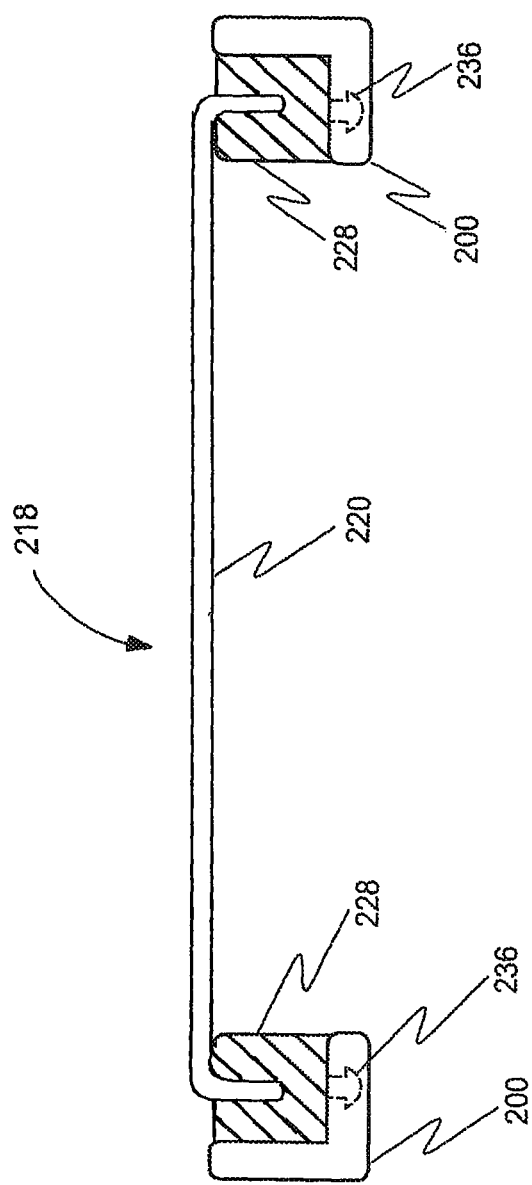
FIG. 6 is a diagram showing a cross-sectional view of a comfort frame assembly comprising suspension fabric.

As best seen in the sectional view of FIG. 6, fabric carrier 218 may comprise a fabric carrier ring 228. The fabric carrier ring 228 may roughly correspond to the outer edge of support frame 200 and has openings which overlap the openings formed in support frame 200 (e.g., openings 202/214 seen in FIG. 4). In the embodiment shown in FIG. 6, support frame 200 has a generally L-shaped cross section in the areas proximate to an opening.

Fabric carrier ring 228 may be molded from a variety of suitable thermoplastic materials or the like. Fabric carrier 218 may be manufactured by encapsulating at least a portion of suspension fabric 220 in fabric carrier ring 228. For example, the margin along the perimeter of the suspension fabric 220 can be encapsulated in fabric carrier ring 228 such that it spans the opening formed in fabric carrier ring 228. Fabric carrier 218 can be attached to support frame 200 using any suitable means, including without limitation: fasteners, adhesive, snaps, clips, bonding, or the like. For example, fabric carrier ring 228 may include prongs, barbs, or other features 236 that enable fabric carrier 218 to be secured to support frame 200 during assembly.

Returning to FIG. 2, the modular passenger seat assembly 102 may further comprise a suitably configured pivot mechanism that accommodates pivoting (or other modes of travel) of the comfort frame assembly 108 relative to the structural frame 106. The pivot mechanism may also accommodate features that permit the installation and removal of the comfort frame assembly 108 from the structural frame 106. The pivot mechanism may be configured to accommodate pivoting of comfort frame assemblies 108 about an axis that is located near lower end 114 of structural frame 106. For this embodiment, lower end 114 roughly corresponds to a passenger ankle or foot location, and the pivot axis corresponds to a rod 132 or other hinge element of seat assembly 102. For this embodiment, the pivot mechanism includes rod 132 (seen in FIGS. 2 and 3) and tube sections 238 formed in support frame 200 near lower edge 206 (seen in FIGS. 4 and 5). Tube sections 238 are pivotally coupled to rod 132, which is in turn secured to lower end 114 of structural frame 106. Seat assembly 102 may include actuators, springs, control mechanisms, mechanical travel stops, and other features that allow the passenger to adjust the position of comfort frame assembly 108 relative to structural frame 106.

In accordance with the teachings herein, each aircraft passenger seat described above can be modified to include a respective apparatus for increasing the thermal comfort of seated passengers in hot and cold conditions. Such an apparatus is referred to herein as a "variable thermal resistance device". For example, each aircraft passenger seat can be modified by incorporating a first variable thermal resistance device underneath the seat and a second variable thermal resistance device behind the seat. Each variable thermal resistance device can be actuated to change from a closed state to an open state (in order to cool the passenger) or from an open state to a closed state (in order to warm the passenger). A variable thermal resistance device of any one of the types disclosed hereinafter provides greater thermal comfort to seated persons during hot-day ground conditions by decreasing the effective insulation value of the seated person's clothing. During cold-day conditions at cruise, this effect can be negated, increasing the effective insulation value of the seated person's clothing.

Clothing thermal resistance is measured in "clo" units. (See "ASHRAE Fundamentals Handbook" or any guide on thermal comfort for guidance on "clo" units.) A person in a temperate climate (e.g., Seattle) typically wears clothing having a thermal resistance about 0.7 clo. Sitting on a conventional aircraft passenger seat adds roughly 0.15 clo of thermal insulation, equivalent to putting on a sweater vest. Sitting on a mesh fabric, webbed, or ventilated seat squeezes the air out of a person's clothing without adding any significant thermal resistance of its own. This reduces a person's thermal insulation by roughly 0.15 clo, which is equivalent to removing a short-sleeved shirt.

Variable thermal resistance devices will be disclosed hereinafter which can passively subtract at least 0.15 clo to enhance comfort in hot conditions, or add at least 0.15 clo to enhance comfort in cold conditions, without the use of fans or other active cooling devices. A variety of different configurations will be described hereinafter for attaining the desired effect, but all versions have either a porous (i.e., air-permeable) or air-impermeable layer supporting the seated person combined with some mechanism for obstructing ventilation or heat transfer through or across the back surface of the supporting layer.

Figure 8:
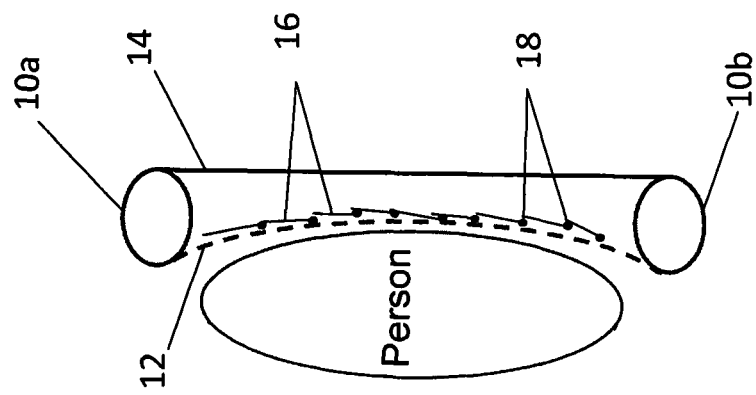
FIGS. 7 and 8 are diagrams showing components of a modified passenger seat having actuatable louvers for selectively opening (see FIG. 7) and closing (see FIG. 8) an air-permeable layer that is in contact with the body of a seated passenger.
Figure 7:
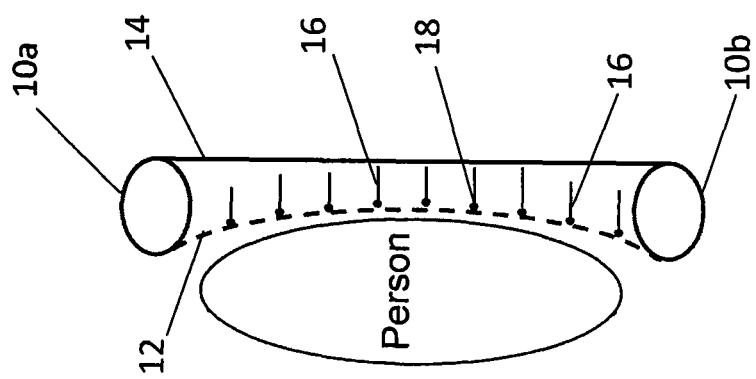

FIGS. 7 and 8 show components of a modified passenger seat having actuatable louvers 16 for selectively opening (see FIG. 7) and closing (see FIG. 8) openings or pores of an air-permeable suspension fabric 12 under tension that is in contact with and supports a portion of the seated passenger's body. [As used herein, the term "louver" refers to a panel, fin or slat that is movable.] Suitable suspension fabric may take the form of a woven or knitted fabric (for example, webbing or mesh fabric) made of synthetic fibers. More specifically, the suspension fabric 12 may be formed from a relatively tough, stretchable, and resilient material or combination of materials, such as DUPONT™ DYMETROL® high-performance bi-component woven fabric (comprising elastomeric DUPONT™ HYTREL® filaments and high-quality textile yarn), polyester, nylon, KEVLAR®, NOMEX®, or the like. The suspension fabric 12 is attached to a fabric carrier ring (not shown in FIGS. 7 and 8) and spans an opening formed by portions of the seat frame (only portions 10a and 10b of the seat frame are shown in FIGS. 7 and 8). Seats of this design are significantly lighter in weight than conventional aircraft passenger seats, and are also thinner, allowing more seats on an aircraft without compromising accessibility.

In accordance with the embodiment shown in FIGS. 7 and 8, the variable thermal resistance device comprises a row of louvers 16 having one edge 18 which is attached (e.g., by stitching or fasteners) to the suspension fabric 12 in a manner such that the louvers can rotate between positions which are respectively perpendicular and parallel to the mesh or web-like fabric 12. The opening in the fabric carrier ring can be covered by a decorative back cover 12. The air in the airspace between suspension fabric 12 and back cover 14 flows easily through the suspension fabric 12 when the louvers 16 are perpendicular thereto (see FIG. 8), whereas air is constrained from flowing through the suspension fabric 12 when the louvers 16 are placed parallel to the fabric (see FIG. 8). The back cover 14 would hide the louvers from view and protect them from tampering.

The system schematically depicted in FIGS. 7 and 8 further comprises an actuator (not shown in FIGS. 7 and 8) for closing the row of louvers by moving them from the perpendicular state shown in FIG. 7 to the parallel state shown in FIG. 8, and for opening the row of louvers by moving them from the parallel state shown in FIG. 8 to the perpendicular state shown in FIG. 7. The actuator can be operated either manual or automatic.

In accordance with one embodiment, the actuator comprises a series of cords, wires, or strings to move the louvers 16 from one state to the other, and pulleys, loops, eyelets or guides to connect the cords, wires or string to a manually operated actuating mechanism.

Figure 9:
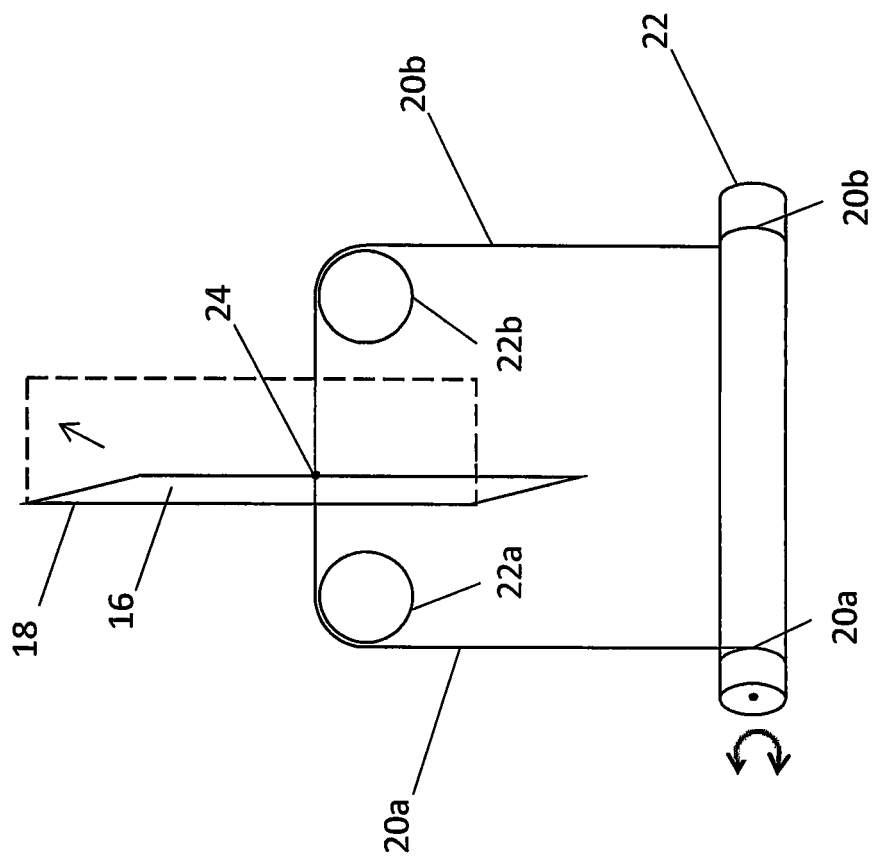
FIG. 9 is a diagram illustrating the principle of operation of the louver-equipped passenger seat diagrammed in FIGS. 7 and 8.

The principle of operation of a variable thermal resistance device comprising louvers actuated by cords is shown in FIG. 9, which shows a single louver 16 connected to an actuator in the form of a rotatable cylinder 22, (e.g., a drum, spool, roll or tube) by means of a single cord having two segments 20a and 20b. The point of the cord at which cord segments 20a and 20b connect to each other is attached to the movable distal edge of the louver 16 at location 24. (Alternatively, two separate cords 20a and 20b could be used.) A terminal portion of cord segment 20a is wrapped in one direction around a first portion of the rotatable cylinder 22, while a terminal portion of cord segment 20b is wrapped in an opposite direction around a second portion of the rotatable cylinder 22. Thus, when the rotatable cylinder 22 rotates in one direction, causing louver 16 to move from its closed position (indicated by dashed lines in FIG. 9) to its open position, an increasing length of cord segment 20a is wound onto the first portion of rotatable cylinder 22, while an increasing length of cord segment 20b is being unwound from the second portion of rotatable cylinder 22. Conversely, when the rotatable cylinder 22 rotates in the opposite direction, causing the louver to move from its open position to its closed position, an increasing length of cord segment 20a is unwound from the first portion of rotatable cylinder 22 while an increasing length of cord segment 20b is being wound onto the second portion of rotatable cylinder 22. Cord segments 20a and 20b should have sufficient slack that cord tension will not interfere with or impede rotation of the louver and the accompanying displacement of its distal edge toward and away from the seat material during opening and closing. For the purpose of simplification, FIG. 9 shows cord segment 20a passing over a first pulley 22a and cord segment 20b passing over a second pulley 22b. However, any number of pulleys can be utilized depending on the requirements of the respective paths to be followed by the cord segments.

Multiple cords may be provided which wrap around the rotatable element 22 at respective axial positions and which connect to each louver in a row at respective locations. For example, louvers in the form of slats may have two cords attached at upper and lower locations. Furthermore, although FIG. 9 shows the cord connected to only one louver, it should also be understood that each cord can be attached to each louver of a row of louvers so that all louvers in a row open and close in unison. In addition, the array of louvers may comprise multiple rows, the height of the louvers being reduced so that they resemble tiles more than panels, fins or slats.

The rotatable cylinder 22 shown in FIG. 9 can be placed underneath the passenger seat, but within reach of the seated passenger. One end of the rotatable cylinder may be provided with a knob having a grooved or textured surface to facilitate turning with one hand. Instead of a knob, the user interface can consist of a lever or any other suitable device for pulling the cords or strings by manual operation.

In accordance with one embodiment, each louver may comprise a firm foam core wrapped inside soft, insulative fabric, for example, Polarfleece™. [Polarfleece™ is a soft napped insulating synthetic fabric made from polyethylene terephthalate or other synthetic fibers.] Other types of fabric may be substituted for the polar fleece; other substrates (e.g., wood or composite material) may be substituted for the foam core. Panels can be utilized instead of the louvers. The louvers may be attached directly to the suspension fabric or to some other surface of the seat assembly. The louvers could be fitted with magnets or hook-and-loop fasteners such that when they are in the closed state, they seal air movement more effectively.

The louvers could be rigid if they were segmented lengthwise. For example, several dozen postage stamp-sized tiles could be joined along one edge, with that edge sewn to the back of the seat mesh fabric. The opposite edge would be joined with an elastic cord to combine the tiles into a louver. The entire chain of rigid tiles would be swung against the mesh to close, or away from the mesh to open, flexing to match the curvature of the seated passenger's back.

The number of louvers possible is a function of the thickness of the louvers. If the louvers are paper-thin, then there can be a great many small louvers. For louvers with an appreciable thickness, there is a limit on the number of louvers because the thickness of each louver obstructs some airflow in the open state. In one implementation, the seat back thickness limits the louver width to slightly more than 1 inch, allowing about 16 louvers per seat back. The seat bottom allows louvers up to 2 inches deep, allowing about eight louvers. The louvers need not have a consistent thickness: a louver which was thin at the base and thicker away from the seat mesh fabric would be more efficient in cooling mode than a louver of continuous thickness.

In accordance with an alternative embodiment, the suspension fabric seen in FIGS. 7 and 8 can be replaced by a rigid perforated material, including plastic or metal, or can even be a conventional foam cushion fitted with large channels or tubes to allow air to flow through the cushion.

Alternatively, the passenger supporting surface may include porous or perforated cushions made of spring-like materials, such as those used for some mattresses and sofas, provided that sufficient air to flow through the cushion from back to front.

Instead of strings or cords, the closing/opening mechanism may consist of a sheet of porous material attached to the louvers (or panels), such that when this sheet of fabric is moved parallel to the seated surface it pulls the louvers (or panels) from an open state to a closed state and back.

In accordance with the further alternative embodiment shown in FIGS. 10A and 10B, the passenger support surface 30 could be a substrate made of a non-porous (i.e., air-impermeable) material having high thermal conductivity, such that when airflow is constrained from flowing across the back of support surface 30 by closed louvers 34 (see FIG. 10A), heat transfer from the support surface 30 into the ambient atmosphere is obstructed. Conversely, when the louvers 34 are open (see FIG. 10B), heat transfer into the ambient atmosphere is not obstructed.

High-thermal-conductivity material can also be used when the support surface is air-permeable. For example, highly thermally conductive elements can be incorporated in a support surface comprising mesh fabric and/or the louvers to enhance heat transfer when the louvers are in the open state. This could consist, for example, of highly thermally conductive fibers (like woven copper or woven carbon mesh) incorporated into (i.e., integrated with) the seat mesh fabric and the face of the louvers that folds towards the seat mesh. Thus, when the louvers are open, the highly thermally conductive fibers conduct heat to the open face of the louvers and this cools the seated passenger; and when the louvers are closed, the highly thermally conductive fibers on the louvers are folded back onto themselves, against the seat mesh fabric, and are not exposed to air movement, and the passenger is not cooled by the conductive fibers.

Another option would be to incorporate highly thermally conductive fibers into the seat mesh fabric itself, such that fibers on one surface are in contact with the seated passenger's back, and on the other side they are exposed to free air when the louvers are open, and not exposed to free air when the louvers are closed.

Suitable highly thermally conductive materials preferably have a thermal conductivity of at least 40 W/m-° K. However, the shape of the high-thermal-conductivity material matters as much as the thermal conductivity in the overall heat transfer equation of the body to the ambient atmosphere. In accordance with one embodiment, thermal heat sink compounds made of silicon rubber compounds that conduct heat better than steel and also provide an elastic conformability could be used as seat material.

Figure 11A:
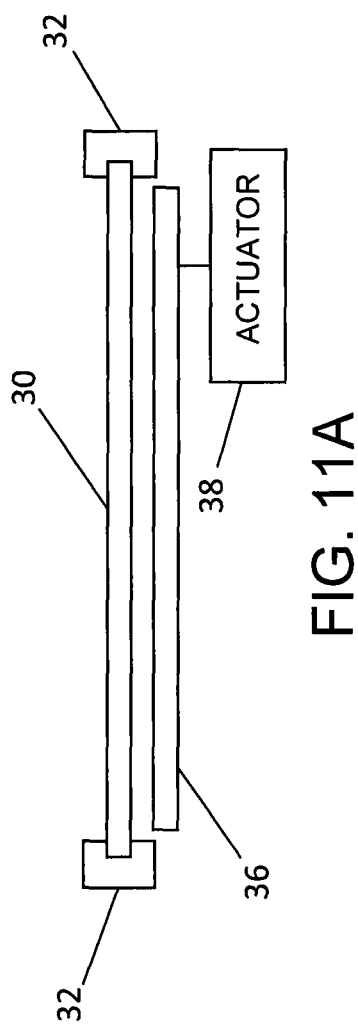
FIGS. 11A and 11B are diagrams showing an alternative embodiment in which airflow to and/or heat transfer from a passenger support surface (either air-permeable or non-porous) can be controlled by a non-porous movable surface.
Figure 11B:
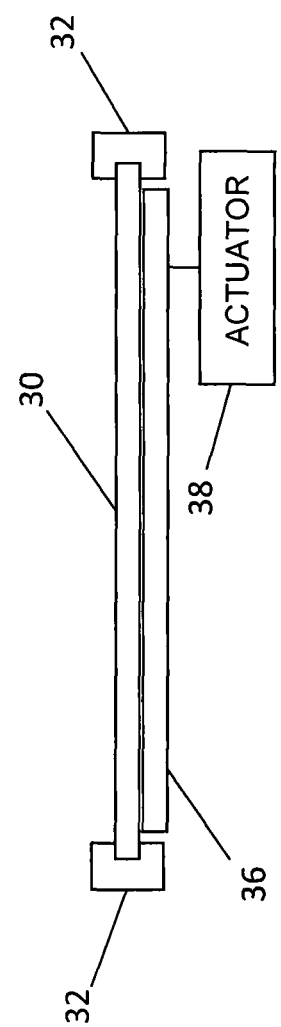
Figure 14:
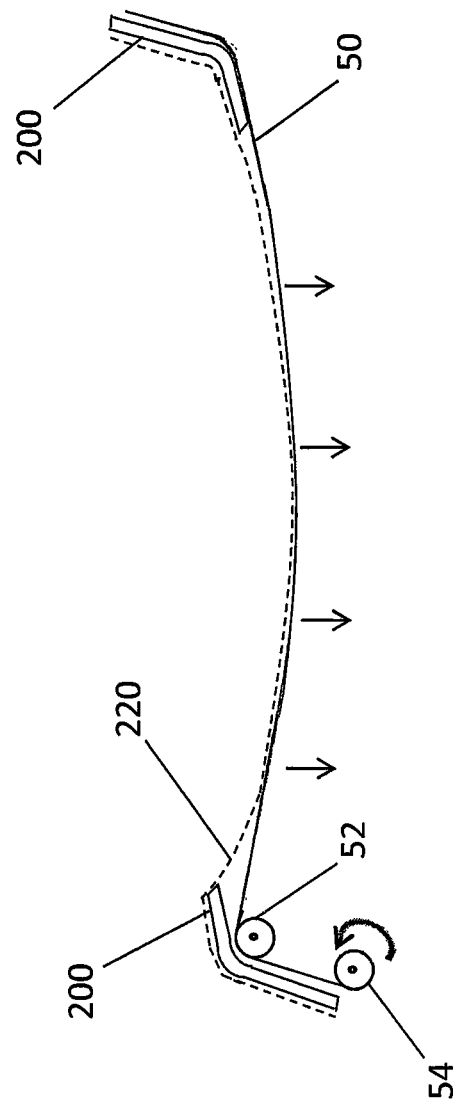
FIG. 14 is a diagram showing the principle of operation of a variable thermal resistance comprising a fabric sling which, when under tension (as shown in FIG. 14), contacts a suspension fabric supporting a passenger to obstruct airflow through the suspension fabric and, when slack (not shown in FIG. 14), does not obstruct airflow through the suspension fabric.

Instead of louvers, airflow to and/or heat transfer from a passenger support surface 30 (either air-permeable or non-porous) can be controlled by a non-porous movable surface 36 disposed parallel to the support surface 30, as seen in FIGS. 11A and 11B. For example, the non-porous movable surface 36 may take the form of a foam cushion placed beneath or behind the support surface 30. In the cooling mode shown in FIG. 11A, the nonporous movable surface 36 is spaced apart from the support surface 30. In response to the seated passenger's selection of the heating mode, an actuator 38 presses the non-porous movable surface 36 against the back of the support surface 30, as shown in FIG. 11B. For a movable panel, the actuator may comprise a four-bar linkage or cam to lift the movable panel close to the support surface, In accordance with a further embodiment, the movable surface make take the form of a fabric sling 50 draped under and behind a support frame 200 as partially depicted in FIG. 14. The fabric sling 50 may comprise a sheet of fabric which is insulating (i.e., when support surface 30 has high thermal conductivity) and/or impervious to airflow (i.e., when support surface 30 is pervious to airflow). One end of the fabric sling 50 can be secured to an upper portion (not shown) of the support frame 200; the other end of fabric sling 50 is attached to and wound around a rotatable cylinder 54. A portion of the fabric sling 50 passes over a second rotatable cylinder 52 as the sling is wound onto or paid out from the rotatable cylinder 54. In this embodiment, a suspension fabric 220 spans an opening in the support frame 200. In the heating mode, the fabric sling 50 can be tensioned into contact with the suspension fabric 220 by rotating the rotating cylinder 54 in the direction indicated by the arrow in FIG. 14. (The spacing between suspension fabric 220 and fabric sling 50 is provided for the purpose of clarity so that the dashed and solid lines do not contact each other, which contact would obscure the representation of separate fabrics.) Conversely, in order to switch from the heating mode to the cooling mode, the rotating cylinder 54 can be rotated in the opposite direction from that indicated by the arrow in FIG. 14. In that event, the fabric sling would become slack and fall away from the suspension fabric 220, as indicated by a series of straight arrows in FIG. 14. The fabric sling 50 may comprise woven fabric or felt.

Alternatively, the fabric sling could carry a substrate (e.g., a foam cushion) which is pressed against the underside of the suspension fabric when the fabric sling is tensioned.

In accordance with a further alternative embodiment, a bladder or bag could be devised to expand as cabin pressure changes, thereby pressing an impervious surface against the bottom or back of a suspension fabric or other type of porous substrate, thereby obstructing airflow through the pervious substrate.

In accordance with further embodiments, airflow and/or heat transfer can be controlled by enclosing the space under or behind a suitable supporting surface which is pervious or has high thermal conductivity, such that the enclosed space is opened to airflow or constrained from allowing airflow by actuation of variable thermal resistance device. For example, FIG. 12 shows a space 40 behind a support surface 30, which space 40 can be enclosed by a variable thermal resistance device in the form of a stretchable sheet 42 whose porosity increases when stretched, e.g., by rotating a rotatable cylinder 44.

Figure 13:
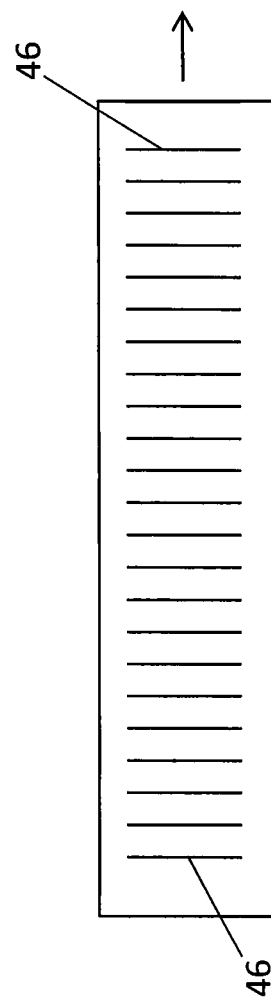
FIG. 13 is a diagram showing a plan view of a stretchable slitted sheet which can be used in the embodiment depicted in FIG. 12.

FIG. 13 shows a plan view of an embodiment in which the stretchable sheet 42 has an array of parallel, equally spaced slits 46. When one end of stretchable sheet 42 is pulled in the direction of the arrow while the other end is fixed, the stretchable sheet 42 will stretch, causing the slits 46 to open (they are shown closed in FIG. 13).

Figure 12:
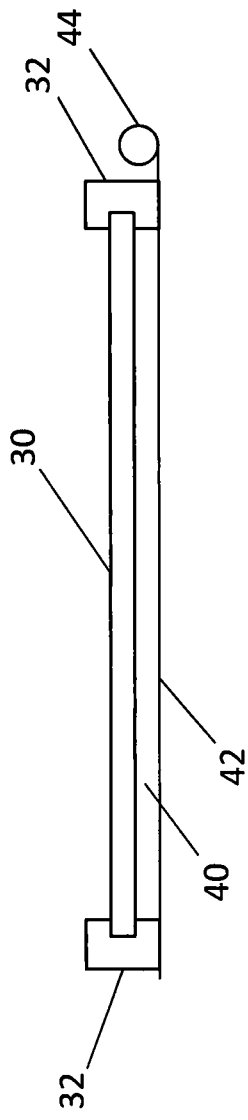
FIG. 12 is a diagram showing a sectional view of a portion of a passenger seat equipped with a variable thermal resistance device in the form of a stretchable sheet whose porosity increases when the sheet is stretched in accordance with an alternative embodiment.

In accordance with a variation of the embodiment shown in FIGS. 12 and 13, the stretchable sheet may comprise numerous small staggered slits closely spaced such that when the sheet is in tension along the axis of the slits, the sheet is impermeable, but when tension is applied perpendicular to the axis of the slits (or shear is applied to the sheet), the slits open and ventilate the support surface.

In accordance with an alternative embodiment shown in FIGS. 16A and 16B, the seat back cover 60 can be provided with vents 64 and 66 that open and close. When the vents are closed as shown in FIG. 16A, the space 62 between the back cover 60 and an air-permeable back support surface 12, which is heated by the passenger's body, would be enclosed. In contrast, when the vents 64, 66 in the back cover 60 are opened, cool air can enter the enclosed space 62 via vent 64 and the warm air inside the enclosed space 62 can exit via the vent 66 (this air flow is indicated by arrows in FIG. 16B), thereby cooling the seated passenger. The vents may be coupled so that they move in tandem in response to manual rotation of a knob mounted on one side of the passenger seat or pressing of a switch that turns on a motor.

In accordance with other embodiments, the actuating mechanism might comprise a motor, which would switch the variable thermal resistance device from a heating mode to a cooling mode and back automatically as directed by an electronic controller, or as directed by a switch on the seat, operated by the seat occupant.

In accordance with a further alternative embodiment, the actuating mechanism may comprise a thermally activated device (for example, a bimaterial or shape memory alloy actuator) which would switch the variable thermal resistance device from a heating mode to a cooling mode and back automatically as the cabin temperature changed. Optionally, the actuating mechanism might comprise a pressure-operated device (for example, a bellows, piston or bladder) which would switch the seat from heating mode to cooling mode and back automatically as the cabin pressure changed.

If an airline were to decide to have all the variable thermal resistance devices be resettable to (for example) a fully open position after the arriving passengers leave and before the next group of passengers arrive, maintenance time would be required to reset the seats which are not remotely resettable electronically. This could be resolved with the addition of a spring-actuated device that would reset the seat to the fully open position when the passenger rises from the seat. The airline would have to balance the added weight, complexity, and increased failure rate caused by a spring-loaded return mechanism versus the effort to manually reset the seats as they are being cleaned between flights.

Figure 15:
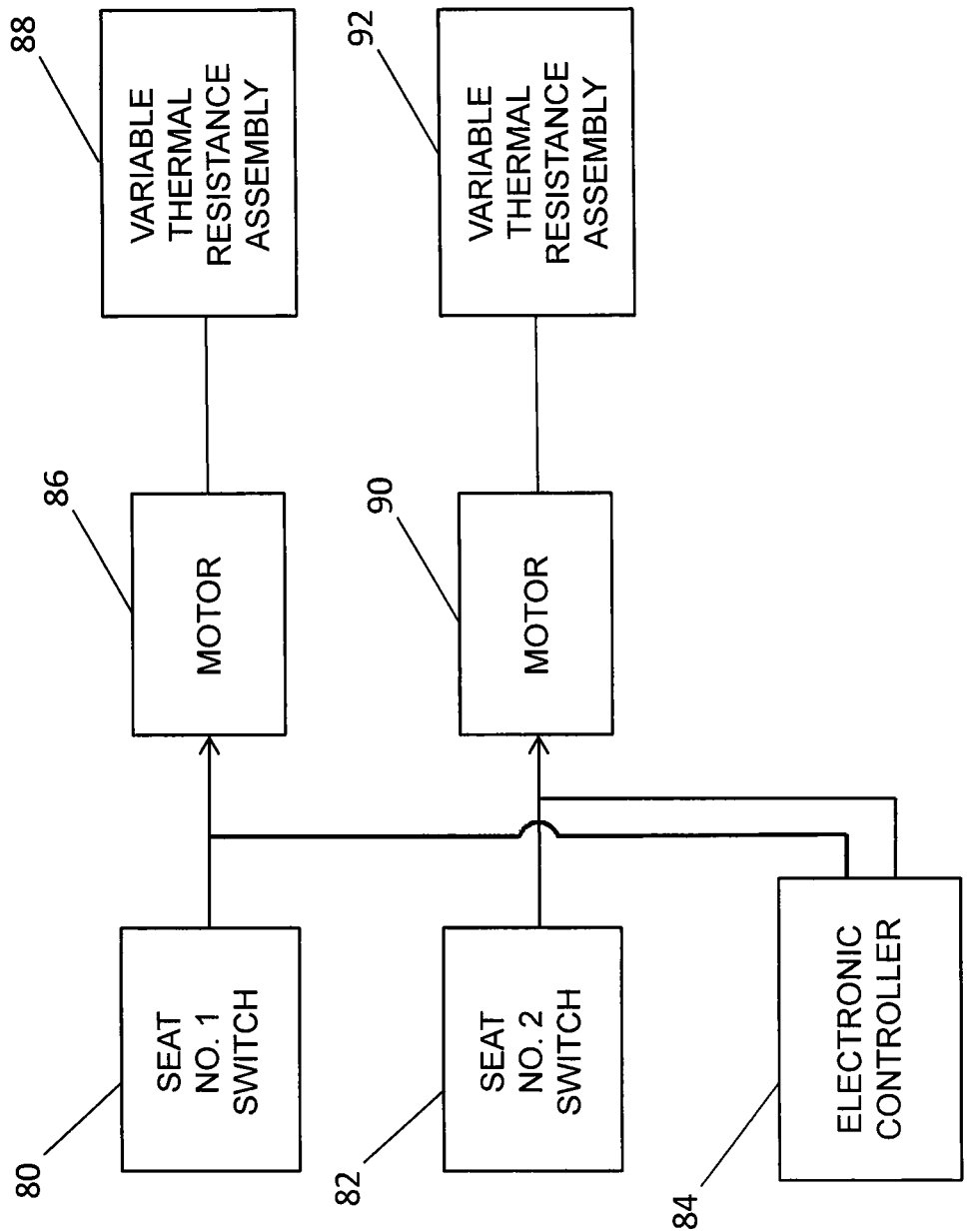
FIG. 15 is a block diagram showing components of an electronically controlled system for varying the thermal resistance of passenger seats of a vehicle.

Alternatively, in cases wherein the variable thermal resistance devices are actuated by electronic motors, all the variable thermal resistance devices could be remotely resettable electronically. For example, FIG. 15 is a block diagram showing components of an electronically controlled system for varying the thermal resistance of passenger seats of a vehicle. Components for only two seats are shown. Seat No. 1 comprises a variable thermal resistance assembly 88 which can be actuated by a motor 86 in response to the passenger seated in Seat No. 1 pressing a switch 80 located on an armrest; similarly, Seat No. 2 comprises a variable thermal resistance assembly 92 which can be actuated by a motor 90 in response to the passenger seated in Seat No. 2 pressing a switch 82 located on an armrest. Alternatively, a flight crew member could actuate both motors 86 and 90 remotely using an electronic controller 84. The electronic controller 84 can be programmed to reset all variable thermal resistance assemblies in sequence or in groups in response to the input of a command via a user interface (not shown).

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed.

As used in the claims, the term "support surface" refers to a substrate capable of supporting weight. A support surface can be either porous (i.e., air-permeable) or non-porous. Similarly, as used in the claims, the term "movable surface" refers to a substrate which is movable. As used herein, the term "substrate" encompasses at least the following: a sheet (plastic or metal), a layer of foam, woven or non-woven fabric, webbing, or a mesh.

The invention claimed is:

1. A seating assembly comprising:
a frame having an opening;
a support surface spanning said opening in said frame;
a variable thermal resistance device that is configurable to adjust a thermal insulation of a person in contact with said support surface, said variable thermal resistance device having a closed state in which airflow is obstructed, said variable thermal resistance device being movable from said closed state to an open state in which airflow is not obstructed and from said open state to said closed state; and
an actuator coupled to said variable thermal resistance device, said actuator being operable to actuate movement of said variable thermal resistance device between said open and closed states.

2. The seating assembly as recited in claim 1, wherein said variable thermal resistance device opposes said support surface when said variable thermal resistance device is in a closed state in which airflow is obstructed.

3. The seating assembly as recited in claim 1, wherein said variable thermal resistance device comprises a sheet of stretchable material attached to said actuator, said sheet comprising a multiplicity of slits which are open when said sheet is in a stretched state due to operation of said actuator, said slits being closed when not in said stretched state.

4. The seating assembly as recited in claim 1, wherein said support surface comprises material having high thermal conductivity.

5. The seating assembly as recited in claim 1, wherein said actuator comprises a thermally activated device, a pressure-operated device, or a motor.

6. The seating assembly as recited in claim 1, wherein said support surface is permeable to air.

7. The seating assembly as recited in claim 6, wherein said support surface comprises suspension fabric under tension.

8. The seating assembly as recited in claim 1, wherein said variable thermal resistance device comprises a multiplicity of louvers.

9. The seating assembly as recited in claim 8, wherein said louvers are coupled to said support surface.

10. The seating assembly as recited in claim 8, wherein said support surface comprises material having high thermal conductivity and said louvers comprise one face having high thermal conductivity and another face that has low thermal conductivity, said one face facing said support surface when said louvers are closed.

11. The seating assembly as recited in claim 8, wherein said actuator comprises a rotatable cylinder and at least one cord comprising a first portion attached to said rotatable cylinder and a second portion attached to said variable thermal resistance device.

12. The seating assembly as recited in claim 1, wherein said variable thermal resistance device comprises a movable surface that is movable between an open position not in contact with said support surface and a closed position in contact with said support surface in response to actuation by said actuator.

13. The seating assembly as recited in claim 12, wherein said movable surface comprises foam.

14. The seating assembly as recited in claim 12, wherein said support surface is air-permeable and said movable surface comprises non-porous material.

15. The seating assembly as recited in claim 12, wherein said support surface comprises material having relatively high thermal conductivity and said movable surface comprises material having relatively low thermal conductivity.

16. The seating assembly as recited in claim 12, further comprising a spring-loaded resetting mechanism for moving said variable thermal resistance device from said open state to said closed state.

17. The seating assembly as recited in claim 12, wherein said movable surface comprises a sling made of fabric or felt attached to said actuator, said sling being slack and out of contact with said support surface when said actuator is in a first state and under tension and in contact with said support surface when said actuator is in a second state.

18. A seating assembly comprising:
a frame having an opening;
a suspension fabric under tension and spanning said opening in said frame;
a multiplicity of louvers that are movable between a closed state in which said louvers obstruct airflow toward said suspension fabric and an open state in which said louvers do not obstruct airflow toward said suspension fabric; and
a rotatable cylinder coupled to said louvers by at least one cord,
wherein said louvers move from said closed state to said open state when said rotatable cylinder is rotated in one direction, and move from said open state to said closed state when said rotatable cylinder is rotated in another direction opposite to said one direction.

19. The seating assembly as recited in claim 18, wherein each louver comprises a foam core wrapped in fabric which is coupled to said suspension fabric.

20. The seating assembly as recited in claim 18, wherein said louvers comprise magnets or hook-and-loop fasteners arranged to hold said louvers in said closed state.

21. A seating assembly comprising:
a frame having an opening;
a support surface spanning said opening in said frame;
a variable thermal resistance device that opposes said support surface when said variable thermal resistance device is in a closed state in which airflow is obstructed, said variable thermal resistance device being movable from said closed state to an open state in which airflow is not obstructed and from said open state to said closed state; and
an actuator coupled to said variable thermal resistance device, said actuator being operable to actuate movement of said variable thermal resistance device between said open and closed states,
wherein one or both of said support surface and said variable thermal resistance device comprises material having high thermal conductivity of at least 40 W/m-° K.

* * * * *